United States Patent
Kirbas et al.

(10) Patent No.: US 6,701,144 B2
(45) Date of Patent: Mar. 2, 2004

(54) SYSTEM FOR AUTOMATICALLY CONFIGURING FEATURES ON A MOBILE TELEPHONE BASED ON GEOGRAPHIC LOCATION

(75) Inventors: Bilhan Kirbas, La Jolla, CA (US); Mazen Chmaytelli, San Diego, CA (US); Samir K. Khazaka, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 09/799,930

(22) Filed: Mar. 5, 2001

(65) Prior Publication Data

US 2002/0123373 A1 Sep. 5, 2002

(51) Int. Cl.[7] .................................................. H04M 3/42
(52) U.S. Cl. ........................ 455/417; 455/414; 455/456; 455/462; 455/465
(58) Field of Search ................................. 455/417, 456, 455/567, 414, 462, 465, 445, 433, 432, 457, 422

(56) References Cited

U.S. PATENT DOCUMENTS

| | | | | |
|---|---|---|---|---|
| 5,442,805 A | * | 8/1995 | Sagers et al. | 455/456.5 |
| 5,568,153 A | * | 10/1996 | Beliveau | 342/357.1 |
| 5,678,182 A | * | 10/1997 | Miller et al. | 455/12.1 |
| 5,778,304 A | * | 7/1998 | Grube et al. | 455/456.4 |
| 5,857,155 A | | 1/1999 | Hill et al. | 455/456 |
| 6,011,973 A | * | 1/2000 | Valentine et al. | 455/456.6 |
| 6,038,445 A | * | 3/2000 | Alperovich et al. | 455/432.1 |
| 6,230,017 B1 | * | 5/2001 | Andersson et al. | 455/456.6 |
| 6,233,448 B1 | * | 5/2001 | Alperovich et al. | 455/417 |
| 6,314,282 B1 | * | 11/2001 | Weber et al. | 455/404.2 |
| 6,389,288 B1 | * | 5/2002 | Kuwahara et al. | 455/456.6 |
| 6,556,819 B2 | * | 4/2003 | Irvin | 455/410 |

FOREIGN PATENT DOCUMENTS

| | | | | |
|---|---|---|---|---|
| FR | 2803162 | | 12/1999 | |
| GB | 2362786 A | * | 11/2001 | H04Q/7/38 |

* cited by examiner

Primary Examiner—Pablo N. Tran
(74) Attorney, Agent, or Firm—Philip Wadsworth; Charles D. Brown; Donald Kordich

(57) ABSTRACT

A system for automatically reconfiguring a mobile telephone based on geographic location. In the illustrative embodiment, the invention includes a storing unit (40) and an execution unit (70). The storing unit (40) allows the user to save a particular location and the desired configurations corresponding to that location. The execution unit (70) monitors the position of the telephone and, upon entering a saved location, executes the configurations corresponding to that location. The execution unit (70) also returns the configurations to their previous settings after the telephone has exited from the saved location.

6 Claims, 3 Drawing Sheets

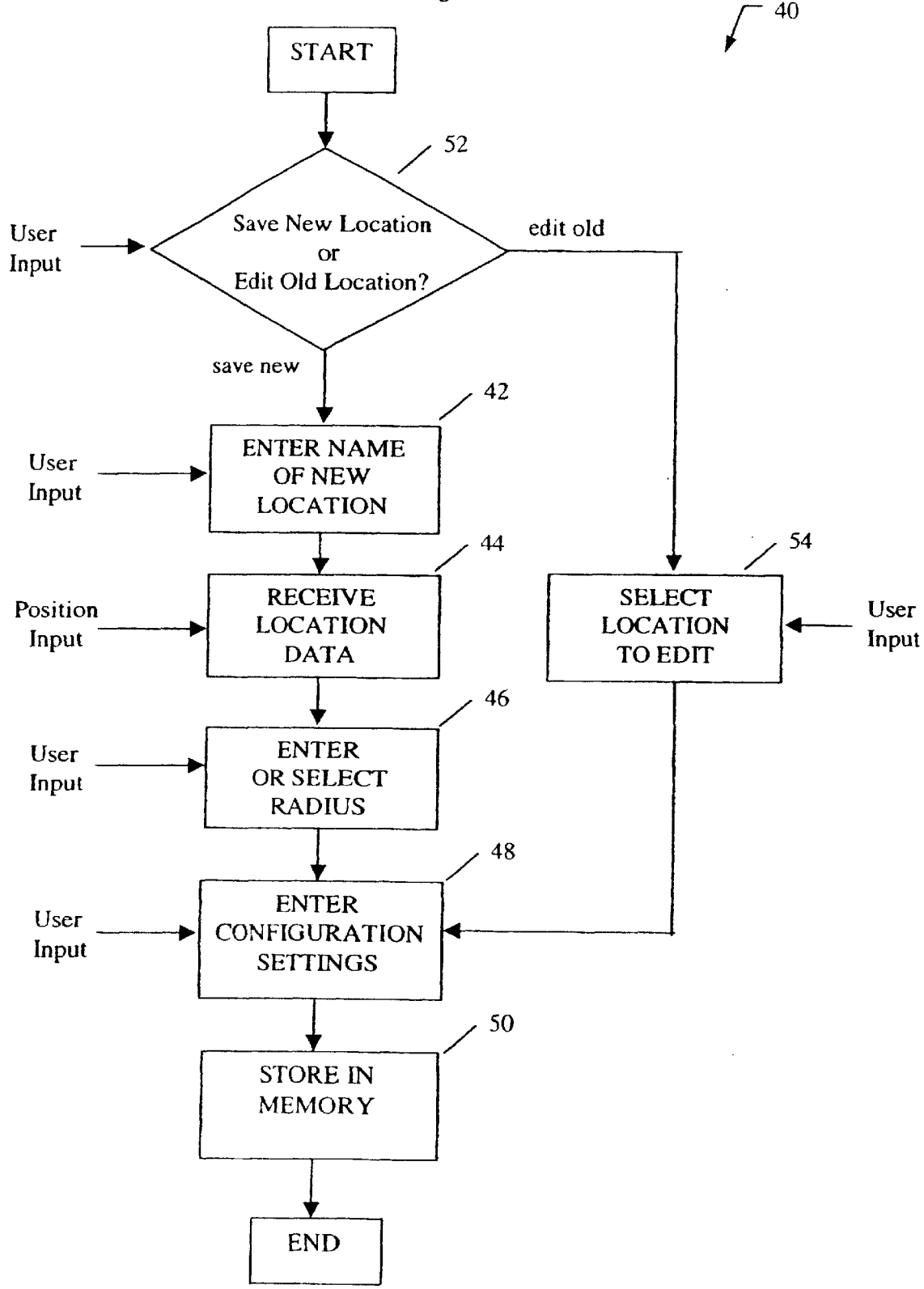

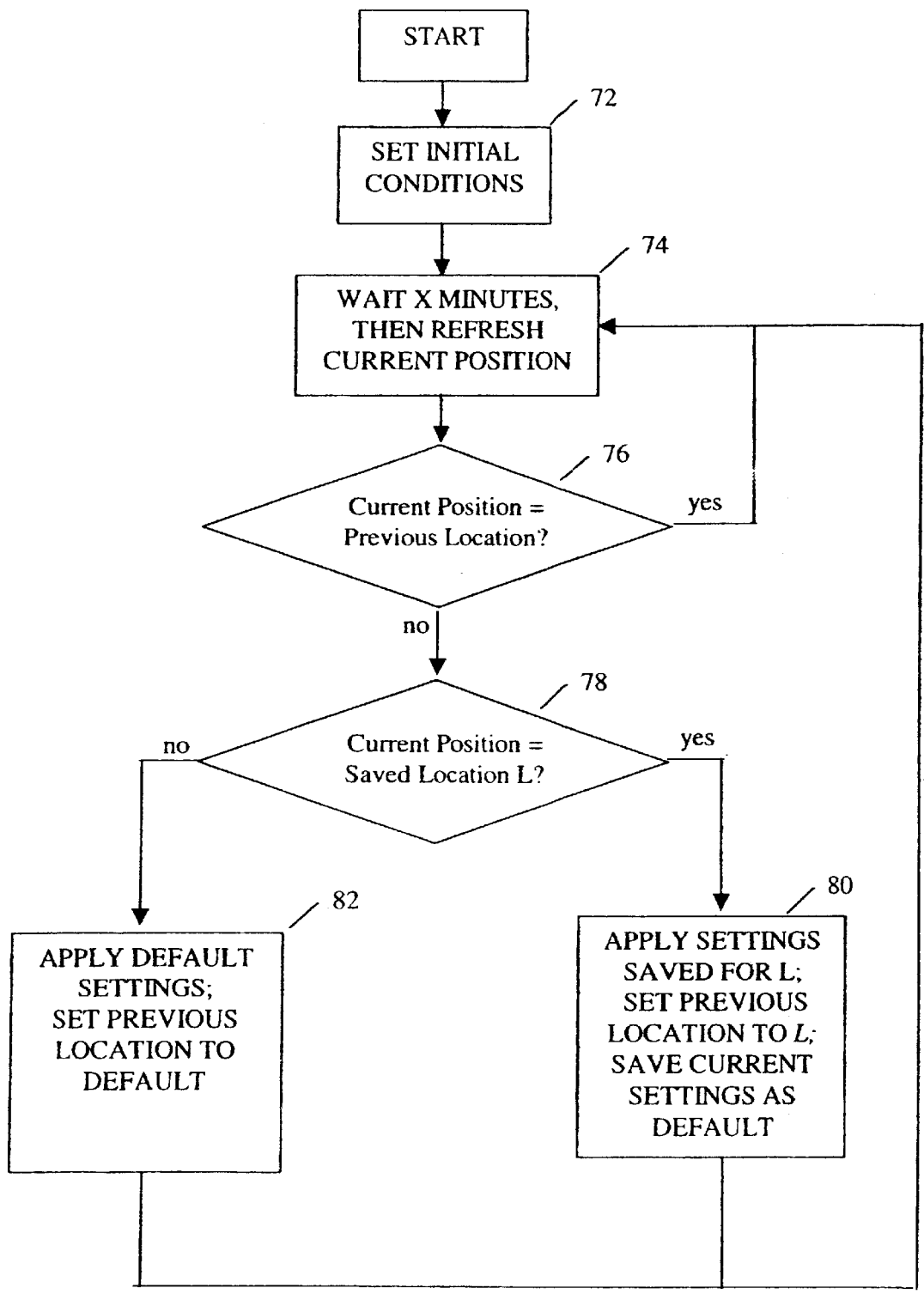

SYSTEM FOR AUTOMATICALLY CONFIGURING FEATURES ON A MOBILE TELEPHONE BASED ON GEOGRAPHIC LOCATION

BACKGROUND OF THE INVENTION

1. Field of the Invention

The present invention relates to electronic circuits and systems. More specifically, the present invention relates to cellular telephony.

2. Description of the Related Art

Many mobile telephones currently offer several configuration options, such as ringing style, vibration mode, and call forwarding. In certain locations, a user may habitually change the configuration settings of his or her telephone. For instance, upon entering a movie theatre, the ringer may be switched off and the vibration mode activated. Upon exiting the theatre, the user will have to remember to reactivate the ringer. If he visits the movie theatre often, he will frequently have to manually change the configurations of the telephone. A telephone which could remember the movie theatre location, and automatically deactivate the ringer upon entering that location (and reactivate it upon exiting), would alleviate this problem. Presently, however, mobile telephones do not have this capability.

Hence, a need exists in the art for a system designed to automatically configure features in a mobile telephone based on geographic location.

SUMMARY OF THE INVENTION

The need in the art is addressed by the present invention, which provides a system for automatically configuring a mobile telephone based on geographic location. In the illustrative embodiment, the invention includes a storing unit and an execution unit. The storing unit allows the user to save a particular location and the desired configurations corresponding to that location. The execution unit monitors the position of the telephone and, upon entering a saved location, executes the configurations corresponding to that location. The execution unit also returns the configurations to their previous settings after the telephone has exited from the saved location. In the preferred embodiment, the storing unit and the execution unit are implemented in software which is run on the microprocessor.

BRIEF DESCRIPTION OF THE DRAWINGS

FIG. 2 is a flow diagram of the storage unit 40 for storing locations and user preferences designed in accordance with the teachings of the present invention.

FIG. 3 is a flow diagram of the execution unit 70 designed in accordance with the teachings of the present invention.

DESCRIPTION OF THE INVENTION

Figure 1:
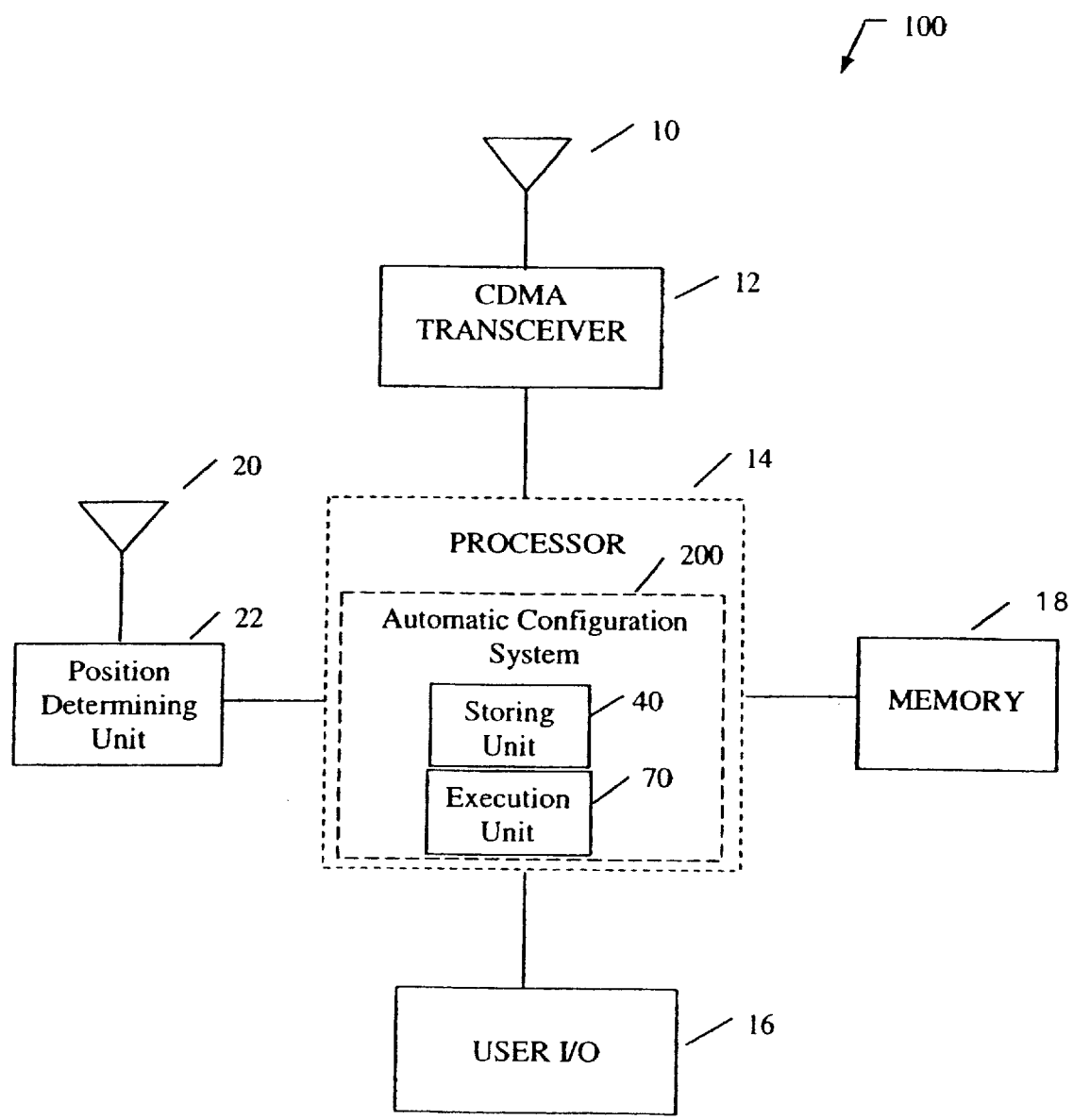
FIG. 1 is a block diagram of a mobile telephone with a system for automatically reconfiguring a cellular phone based on location in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a block diagram of a mobile telephone 100 with a system for automatically reconfiguring the telephone based on its location in accordance with the teachings of the present invention. The telephone is of conventional design and construction with the exception of the automatic reconfiguration system 200 and includes an antenna 10, a CDMA transceiver 12, a microprocessor 14, memory 18, a user input/output interface 16, an antenna 20 for receiving position information, and a position determining unit 22 such as a GPS (Global Positioning System) transceiver.

The automatic reconfiguration system 200 includes a storing unit 40 and an execution unit 70. The storing unit 40 allows the user to save a particular location and the desired configurations corresponding to that location. The execution unit 70 monitors the position of the telephone and, upon entering a saved location, executes the configurations corresponding to that location. The execution unit 70 also returns the configurations to their previous settings after the telephone has exited from the saved location. In the preferred embodiment, the storing unit 40 and the execution unit 70 are implemented in software which is run on the microprocessor 14.

FIG. 2 is a flow diagram of the storing unit 40 for storing locations and user preferences designed in accordance with the teachings of the present invention. The telephone must be in the location to be saved during the storage operation. For best results, the telephone should be at the approximate center of the location. The storage function begins with step 42, prompting the user to enter a name for the new location he would like to save or to select one of a limited number of predetermined storage slots.

The storage function then defines the location to be saved by its center coordinates and its radius. At step 44, the unit receives the telephone's current location from the position determining unit 22. This is the position which will be saved as the location's center coordinates. At step 46, the unit prompts the user to enter the radius of the location. Alternatively, the unit may ask the user to select from a limited number of predefined radius values, such as small (20 ft.), medium (50 ft.), or large (100 ft.). Subsequently, whenever the telephone is within this region defined by its center and radius, the automatic configuration system will consider the telephone to be in this saved location.

Next, at step 48, the storage unit prompts the user to set the configurations which are desired whenever the telephone is in this location. For instance, it can turn the ringer on or off, the vibrate mode on or off, set the ringer volume, implement call forwarding to a specified number, etc.

Finally, at step 50, the location and corresponding configuration settings are stored in memory.

In the best mode, the storing unit 40 also allows the user to edit the parameters of a previously saved location. In this embodiment, the storage function begins with step 52, asking the user whether he would like to save a new location, or edit an old location. If he wants to save a new location, the function goes to step 42 and follows the steps described above.

If the user wishes to edit a previously saved location, then at step 54, he is prompted to select the location he wants to edit. Then the function is directed to step 48 to set the new configurations, and step 50 to store them in memory, as described above.

A special "default" location is defined as all coordinates which are not included in any user saved locations. The default configurations can also be set by the user, by allowing the default location to be selected in step 54.

FIG. 3 is a flow diagram of the execution unit 70 designed in accordance with the teachings of the present invention. This unit is an iterative function which periodically checks the current position of the telephone and compares it with the saved locations. Upon entering a saved location, it applies the configurations previously specified by the user. Also, upon exiting a saved location, it returns the configurations to their previous settings or sets them to the saved "default" settings.

When the automatic configuration system is first turned on, the execution unit 70 first sets the initial conditions (step 72). A "previous location" variable remembers whether the telephone was in the default location or one of the saved locations during the previous iteration. The previous location variable is initially set to "default", and the default configuration settings, if available, are applied. If the default settings were not saved by the user, then the current settings are saved as the default settings. Even if the telephone is not in the default location when the automatic configuration system is turned on, i.e. the telephone is in one of the saved locations, this will be remedied in the first iteration of the execution unit.

The iterative function begins at step 74, waiting for x minutes, where x can be a fixed number set by the manufacturer or a parameter which can be adjusted by the user, then obtaining the current position information from the position determining unit 22.

At step 76, the current position is compared with the previous location. A location is defined by its center coordinates and radius, as discussed in the storage unit section above. If the current position is within the previous location, then it returns to step 74. The phone is in the same location, and no configuration changes need to be issued, so the system continues to monitor the current position.

If the current position is not within the previous location, then the phone has either entered or exited from a saved location. The execution unit then compares the current position with the saved locations (step 78).

If the current position is in a saved location L, then the phone has entered the location L. At step 80, the function sets the previous location (for the next iteration) to this saved location L, saves the current configurations as those for the "default" location (if default settings were not saved by the user), applies the configurations for location L, and then returns to step 74.

If the current position is not within any saved location, then the phone has exited from a saved location. At step 82, the function sets the previous location (for the next iteration) to "default", applies the configurations saved for the "default" location, and then returns to step 74.

This is repeated continuously until the automatic configuration system is deactivated.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of configuring a mobile telephone, the method comprising:

obtaining the current position of the mobile telephone;

determining if the current position is within a previous location, the previous location having been set in a previous location variable;

if the current position is not within the previous location, determining if the current position is within any one of a plurality of saved locations; and if the current position is not within any one of a plurality of saved locations, setting the previous location variable to a default location, wherein the default location being a set of locations that are not included in the plurality of saved locations position, and if a default configuration has been previously set, applying the default configuration corresponding to the default location to the mobile telephone, and if the default configuration has not been previously set, saving a current configuration of the mobile telephone as the default configuration corresponding to the default location.

2. The method of claim 1 further comprising:

if the current position is within a one of the plurality of saved locations, setting the previous location variable to the one saved location, applying a configuration corresponding to the one saved location to the mobile telephone, and if the default configuration has not been previously set, saving a current configuration of the mobile telephone as the default configuration corresponding to the default location.

3. An apparatus for configuring a mobile telephone, the apparatus comprising:

means for obtaining the current position of the mobile telephone;

means for determining if the current position is within a previous location, the previous location having been set in a previous location variable;

means for determining if the current position is within any one of a plurality of saved locations if the current position is not within the previous location; and if the current position is not within any one of the plurality of saved locations, means for setting the previous location variable to a default location, wherein the default location being a set of locations that are not included in the plurality of saved locations position, and means for applying the default configuration corresponding to the default location to the mobile telephone if a default configuration has been previously set, and means for saving a current configuration of the mobile telephone as the default configuration corresponding to the default location if the default configuration has not been previously set.

4. The apparatus of claim 3 further comprising:

if the current position is within any one of the plurality of saved locations, means for setting the previous location variable to the one saved location, means for applying a configuration corresponding to the one saved location to the mobile telephone, and means for saving a current configuration of the mobile telephone as the default configuration corresponding to the default location if the default configuration has not been previously set.

5. An apparatus for configuring a mobile telephone, the apparatus comprising:

a position determining unit configured to obtain the current position of the mobile telephone; and an execution unit configured to,
- determine if the current position is within a previous location, the previous location having been set in a previous location variable,
- determine if the current position is within any one of a plurality of saved locations if the current position is not within the previous location, and
- if the current position is not within any one of the plurality of saved locations,
  - set the previous location variable to a default location, wherein the default location being a set of locations that are not included in the plurality of saved locations, and
  - apply a default configuration corresponding to the default location to the mobile telephone if the default configuration has been previously set or save a current configuration of the mobile telephone as the default configuration corresponding to the default location if the default configuration has not been previously set.

6. The apparatus of claim 5, wherein, if the current position is within the saved location, the execution unit is further configured to:

set the previous location variable to the saved location;

apply a configuration corresponding to the saved location to the mobile telephone; and save a current configuration of the mobile telephone as the default configuration corresponding to the default location if the default configuration has not been previously set.

* * * * *